(12) United States Patent
Fujimori

(10) Patent No.: US 10,277,652 B2
(45) Date of Patent: Apr. 30, 2019

(54) TRANSMISSION APPARATUS, TRANSMISSION METHOD, AND PROGRAM

(71) Applicant: CANON KABUSHIKI KAISHA, Tokyo (JP)

(72) Inventor: Yuki Fujimori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 14/141,136

(22) Filed: Dec. 26, 2013

(65) Prior Publication Data

US 2014/0188975 A1 Jul. 3, 2014

(30) Foreign Application Priority Data

Dec. 28, 2012 (JP) ................................ 2012-287237

(51) Int. Cl.
*G06F 17/30* (2006.01)
*H04L 29/06* (2006.01)

(52) U.S. Cl.
CPC ........ *H04L 65/60* (2013.01); *G06F 17/30053* (2013.01); *H04L 65/602* (2013.01)

(58) Field of Classification Search
CPC ... H04N 21/84; H04N 21/845; H04L 65/4084
See application file for complete search history.

(56) References Cited

U.S. PATENT DOCUMENTS 8,583,818 B2 * 11/2013 Dhruv .............. H04N 21/26233
709/231
2010/0268361 A1 * 10/2010 Mantel .............. G06F 17/30749
700/94

(Continued)

FOREIGN PATENT DOCUMENTS

| JP | 2004-254260 A | 9/2004 |
|---|---|---|
| JP | 2012-514276 A | 6/2012 |
| JP | 2012-138083 A | 7/2012 |

OTHER PUBLICATIONS

R. Pantos, et al., "HTTP Live Streaming draft-pantos-http-live-streaming-09", Apple Inc., Sep. 22, 2012, pp. 1-37, Cupertino, CA, United States.

(Continued)

*Primary Examiner* — Scott B Christensen
(74) *Attorney, Agent, or Firm* — Canon U.S.A., Inc. IP Division

(57) ABSTRACT

A transmission apparatus includes an acquisition unit configured to acquire a list indicating segment data that is acquirable by a receiving apparatus from among a plurality of pieces of segment data obtained by dividing content data, a determination unit configured to determine according to the list, and a control unit configured to perform control to transmit the list at a first timing, if the determination unit determines that the list contains information about segment data that has not been transmitted to the receiving apparatus, and to perform control to transmit the list or a list acquired after the list has been acquired by the acquisition unit at a second timing, which is a timing later than the first timing, if the determination unit determines that the list does not contain information about segment data that has not been transmitted to the receiving apparatus.

14 Claims, 8 Drawing Sheets

(56) References Cited

U.S. PATENT DOCUMENTS

| | | | | |
|---|---|---|---|---|
| 2011/0035442 A1* | 2/2011 | Hjelm | ................ | H04L 41/0266 |
| | | | | 709/203 |
| 2011/0252118 A1* | 10/2011 | Pantos | .............. | G06F 17/30053 |
| | | | | 709/219 |
| 2011/0305436 A1* | 12/2011 | Haberman | ........... | G06Q 10/107 |
| | | | | 386/278 |
| 2012/0063603 A1* | 3/2012 | Evans | ................ | H04N 21/6156 |
| | | | | 381/17 |
| 2012/0259957 A1* | 10/2012 | Keum | ................ | H04L 65/4084 |
| | | | | 709/219 |
| 2013/0121346 A1* | 5/2013 | Mitchell | ............... | H04L 69/163 |
| | | | | 370/465 |
| 2013/0239137 A1* | 9/2013 | Ha | ................... | H04N 21/23608 |
| | | | | 725/32 |
| 2014/0072035 A1* | 3/2014 | Rabii | .................. | H04N 19/176 |
| | | | | 375/240.03 |
| 2014/0186235 A1* | 7/2014 | Kwak | .................... | B01L 3/021 |
| | | | | 422/520 |
| 2015/0127775 A1* | 5/2015 | Munagala | ............. | H04L 65/601 |
| | | | | 709/219 |

OTHER PUBLICATIONS

Information Technology—Dynamic adaptive streaming over HTTP (DASH)—Part 1: Media presentation description and segment formats, Aug. 2, 2013, pp. 10-85.

* cited by examiner

TRANSMISSION APPARATUS, TRANSMISSION METHOD, AND PROGRAM

BACKGROUND

Field

Aspects of the present invention generally relate to data communication technology for performing streaming distribution to transmit and receive content data in real time.

Description of the Related Art

In recent years, there is provided a data communication technology for distributing content data in a streaming format including audio data, and video data and so on in real time to users in a network camera or a video conference system or the like. By such the data communication technology, users can play back the received content data while at the same time receiving the content data.

Further, Hypertext Transport Protocol (HTTP) live streaming (Internet Engineering Task Force (IETF) draft HTTP Live Streaming draft-pantos-http-live-streaming-09), and Moving Picture Experts Group (MPEG)-dynamic adaptive streaming over HTTP (DASH) (ISO/IEC 23009-1) and others as the data communication technology are standardized. In these standards, the transmission apparatus generates a plurality of pieces of segment data by dividing content data such as video data or audio data at predetermined time intervals. Furthermore, the transmission apparatus transmits metadata (referred to as a playlist) containing location information or reproduction order of each generated segment data to the receiving apparatus. The receiving apparatus acquires the segment data based on the location information and the reproduction order of each segment data, which is listed in the received playlist. In this manner, with each of the above-described standards, streaming of the content data is enabled by transmitting and receiving playlists and segment data continuously at predetermined time intervals between the transmission apparatus and the receiving apparatus.

Further, Japanese Unexamined Patent Application Publication (Translation of PCT Application) No. 2012-514276 discusses a method for enabling selection of a media file to be acquired on the receiving apparatus side by the transmission apparatus providing the receiving apparatus for a playlist file of content (hereinafter referred to as a playlist) separately from the content. The media file refers to a file generated by segmenting the content. Further, the playlist is information used by the receiving apparatus to receive media files, which are generated by dividing the content into a plurality of parts, from the transmission apparatus.

The method discussed in Japanese Unexamined Patent Application Publication (Translation of PCT Application) no. 2012-514276 is that the receiving apparatus transmits acquisition requests of playlists (hereinafter, playlist requests) in a periodic manner. In addition, if the received playlist has not been updated in response to the playlist request, a transmission period of the playlist requests will be changed.

However, the method discussed in Japanese Unexamined Patent Application Publication (Translation of PCT) no. 2012-514276 is that the transmission apparatus can transmit only a playlist that has been generated and updated prior to the playlist request, in response to the playlist request received from the receiving apparatus. Consequently, when the transmission apparatus generates and updates a playlist immediately after receiving a playlist request from the receiving apparatus, the transmission apparatus cannot transmit the latest playlist generated and updated until receiving a next playlist request from the receiving apparatus. In this manner, in the conventional technology, there is an issue that the transmission apparatus cannot control a transmission timing of the playlist, because a case of acquiring the latest playlist immediately after receiving the playlist request from the receiving apparatus is not considered.

SUMMARY

Aspects of the present invention are generally directed to a transmission apparatus, which controls a transmission timing of a playlist in response to a playlist request, thereby reducing a loss of time after updating a playlist until the playlist is transmitted to the receiving apparatus.

According to an aspect of the present invention, a transmission apparatus includes an acquisition unit configured to acquire a list indicating segment data that is acquirable by a receiving apparatus from among a plurality of pieces of segment data obtained by dividing content data, a receiving unit configured to receive an acquisition request of the list from the receiving apparatus, a determination unit configured to determine whether the list contains information about segment data that has not been transmitted to the receiving apparatus, and a control unit configured to perform control to transmit the list at a first timing if the determination unit determines that the list contains information about segment data that has not been transmitted to the receiving apparatus, and to perform control to transmit the list or a list acquired after the list has been acquired by the acquisition unit at a second timing, which is a timing later than the first timing, if the determination unit determines that the list does not contain information about segment data that has not been transmitted to the receiving apparatus.

According to an exemplary embodiment of the present invention, if the transmission apparatus has received an acquisition request of a playlist from the receiving apparatus and there are no untransmitted playlists, a loss of time after the transmission apparatus has generated and updated a playlist until transmitting the playlist to the receiving apparatus can be reduced.

Further features of the present disclosure will become apparent from the following description of exemplary embodiments with reference to the attached drawings.

DESCRIPTION OF THE EMBODIMENTS

Various exemplary embodiments will be described in detail below with reference to the drawings.

The processing of the entire system according to a first exemplary embodiment will be described with reference to FIG. 1.

Figure 1:
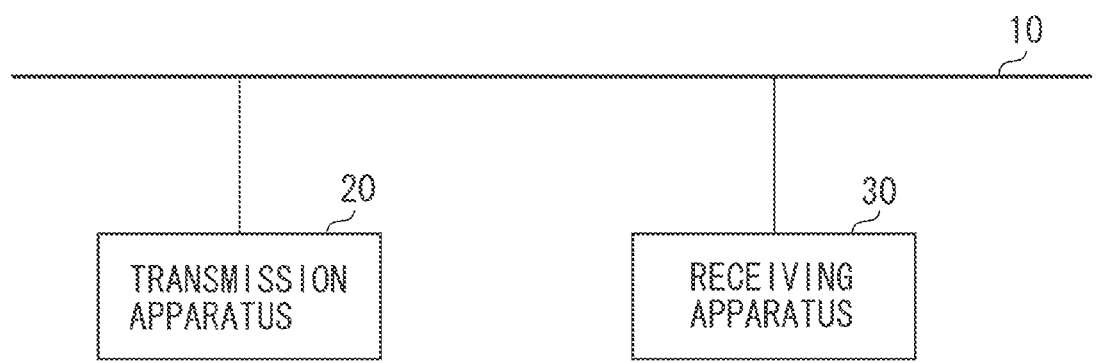
FIG. 1 is a system configuration diagram according to each exemplary embodiment.

FIG. 1 is a diagram illustrating an example of a connection form between a transmission apparatus 20 and a receiving apparatus 30, according to the present exemplary embodiment. In the present exemplary embodiment, the transmission apparatus 20 and the receiving apparatus 30 are connected to each other via a network 10.

The transmission apparatus 20 and the receiving apparatus 30 respectively transmit and receive segment data and metadata (hereinafter, referred to as a playlist). The segment data is acquired by dividing content data at predetermined time intervals. The playlist contains reproduction section information regarding each piece of the segment data via the network 10. Accordingly, the transmission apparatus 20 and the receiving apparatus 30 perform streaming of the content data. The content data is video data, audio data and so on. In the present exemplary embodiment, descriptions will be given below assuming that the transmission apparatus 20 transmits video data as content data to the receiving apparatus 30, but the present embodiment is not limited to this. In other words, the transmission apparatus 20 may transmit audio data as content data to the receiving apparatus 30. Further, the playlist is metadata in which reproduction order, location information (e.g., URL), reproduction time and so on of the each piece of segment data is listed. In the present exemplary embodiment, an M3U8 format text-based is used as a format of the playlist. The details of the playlist in the M3U8 format will be described below with reference to FIG. 2.

The network 10 is configured by, for example, the Internet or a wired local area network (LAN), or a wireless LAN. In the present exemplary embodiment, the network 10 is assumed to be a wired LAN or a wireless LAN as a home network, but the present embodiment is indifferent to communication standard, scale, and configuration of the network 10. As the communication standard of the network 10, wide area network (WAN), ad hoc network, Bluetooth®, Zigbee®, or ultra wide band (UWB) may be used.

The transmission apparatus 20 transmits playlists and segment data, respectively, based on an acquisition request of a playlist (hereinafter, a playlist request) and an acquisition request (hereinafter, a segment data request) of the segment data (hereinafter, a segment data request), each of which is transmitted via the network 10 from the receiving apparatus 30. The transmission apparatus 20 is, for example, a camera, a video camera, a smartphone, a personal computer (PC), and a mobile phone, but the present embodiment is not limited to this. In other words, the transmission apparatus 20 may be any apparatus as long as it satisfies hardware configuration and module configuration described below. Further, the generation of the content data, which the transmission apparatus 20 transmits, may be performed in the transmission apparatus 20 or may be performed by other server apparatus or the like. If the content data is generated by the other server or the like, information regarding the content data may be notified to the transmission apparatus 20.

The receiving apparatus 30 receives each of the playlist and the segment data transmitted via the network 10 from the transmission apparatus 20. Furthermore, according to the present exemplary embodiment, the receiving apparatus 30 is configured to perform reproduction of the received content data, and communication. The content data, which the receiving apparatus 30 has received, may be transmitted to other apparatus, and the other apparatus may reproduce and record the content data. The receiving apparatus 30 is, for example, a smartphone, a PC, a television, and a mobile phone, but the present embodiment is not limited to these. In other words, the receiving apparatus 30 is an apparatus that is provided with functions equivalent to the above-described functions, and may be any apparatus as long as it satisfies the hardware configuration and the module configuration described below. Further, the receiving apparatus 30 connected to the network 10 may be one or more.

Figure 3:
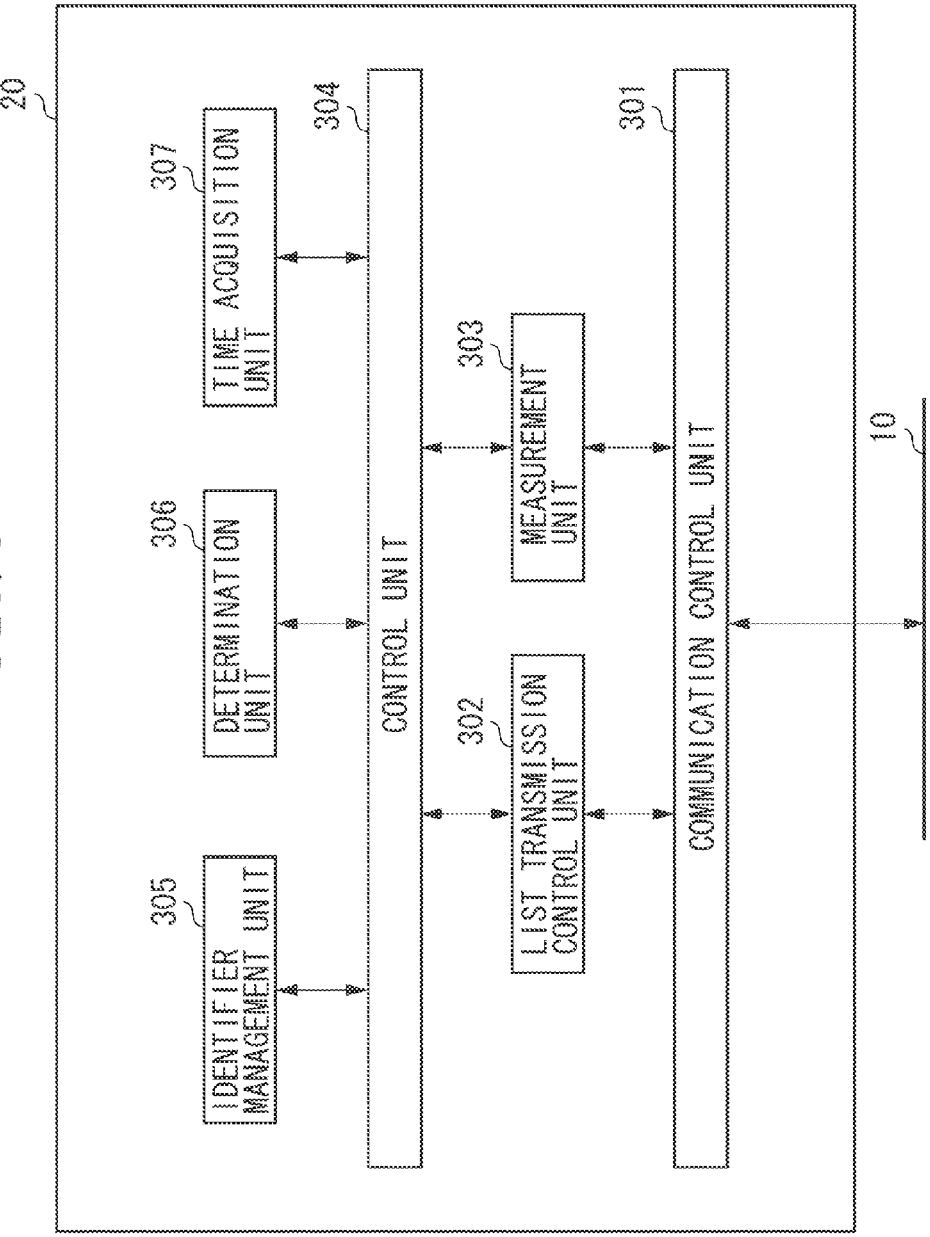
FIG. 3 is block diagram illustrating functional configuration example of a transmission apparatus according to each exemplary embodiment.

FIG. 3 is a functional configuration diagram of the transmission apparatus 20 according to the present exemplary embodiment.

A communication control unit 301 performs communication control for connecting to the network 10. The communication control unit 301 performs communication control in response to a content distribution request from the receiving apparatus 30 and communication control over the content data transmitted to the receiving apparatus 30. The details of the communication control processing in the communication control unit 301 will be described below.

A list transmission control unit 302 performs communication control through the communication control unit 301 to transmit a playlist to the receiving apparatus 30 via the network 10.

A measurement unit 303 performs measurement of communication bands of the network 10 through the communication control unit 301. According to the present exemplary embodiment, the measurement unit 303 performs measurement of the communication bands by measuring a time after the transmission apparatus 20 has transmitted the playlist to the receiving apparatus 30 until the transmission apparatus 20 receives the next playlist request from the receiving apparatus 30. According to the present exemplary embodiment, measurement of the communication bands is performed by a method described above, but the present embodiment is not limited to this. In other words, measuring the communication bands by the equivalent method such as measuring a reply time of PING to be transmitted from the transmission apparatus 20 to the receiving apparatus 30 may be applicable.

A control unit 304 performs control of the entire processing unit of the transmission apparatus 20 illustrated in FIG. 3. In other words, the control unit 304 manages and controls each processing unit 302, 303, and 305 to 307.

An identifier management unit 305 assigns identifiers (IDs) to each session between the transmission apparatus 20 and the receiving apparatus 30 to perform management of the identifiers. One session represents a series of transmission and reception processing performed after the transmission apparatus 20 and the receiving apparatus 30 started communication until they end the communication. Different identifiers are assigned to different sessions, and thus the sessions can be uniquely identified by the identifiers. According to the present exemplary embodiment, non-duplicated unique numerical values are used as identifiers, but the present embodiment is not limited to this. In other words, identifiers having equivalent function such as non-duplicated unique character strings may be used. According to the present exemplary embodiment, the identifier management unit 305 of the transmission apparatus 20 generates the identifier of each session, but the receiving apparatus 30 may generate the identifiers using non-duplicated information such as media access control (MAC) address or the like of the receiving apparatus 30.

A determination unit 306 manages information of whether the latest playlist has been already transmitted with respect to each session managed by the identifier management unit 305. The determination unit 306 performs determination processing to transmit playlists by the method illustrated in FIG. 4 as described below.

A time acquisition unit 307 acquires a time until a playlist is generated and updated (hereinafter, referred to as an update time). According to the present exemplary embodiment, a playlist is generated and updated by a playlist management unit (not illustrated) of the transmission apparatus 20, but the present embodiment is not limited to this. In other words, playlists may be generated and updated by other apparatuses than the transmission apparatus 20, and then may be input to the playlist management unit. The playlist can be generated and updated at a time point when transmission preparation of each segment data obtained by dividing the content data is completed. In other words, a time until transmission preparation of the segment data is completed after the segment data of the content data has been generated becomes an update time. When the transmission preparation of the segment data is completed, the transmission apparatus 20 can transmit the playlist containing reproduction section information regarding the segment data to the receiving apparatus 30. Further, the update time is determined by hardware specification of the apparatus, which generates the segment data, and a processing method for generation and transmission preparations of the segment data.

Figure 4:
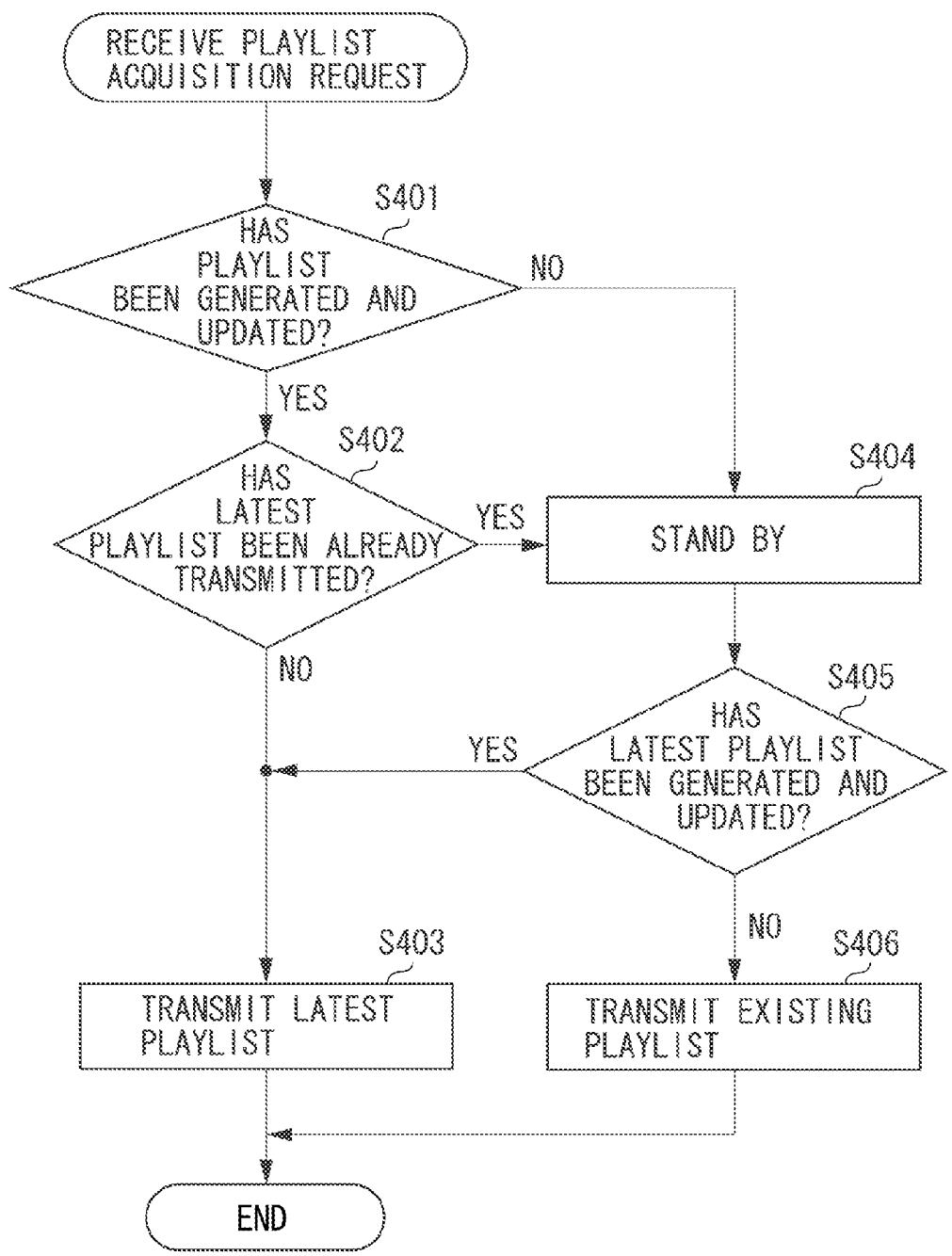
FIG. 4 is a flowchart illustrating an operation of transmission control processing of a playlist in a transmission apparatus according to a first exemplary embodiment.

FIG. 4 illustrates a flow of transmission control processing of a playlist performed by the transmission apparatus 20 according to a playlist request received from the receiving apparatus 30.

According to the present exemplary embodiment, when the transmission apparatus 20 receives the playlist request from the receiving apparatus 30, the determination unit 306 starts the transmission control processing of the playlist.

In step S401, the determination unit 306 performs determination whether the latest playlist has been generated and updated regarding a session for which the playlist request has been received. In this process, the identifier management unit 305 identifies the session based on an identifier included in the playlist request received from the receiving apparatus 30. The playlist is generated when start instruction regarding distribution of the content data is received, and thereafter, the playlist is updated every time each segment data of the content data has been generated.

Figure 2:
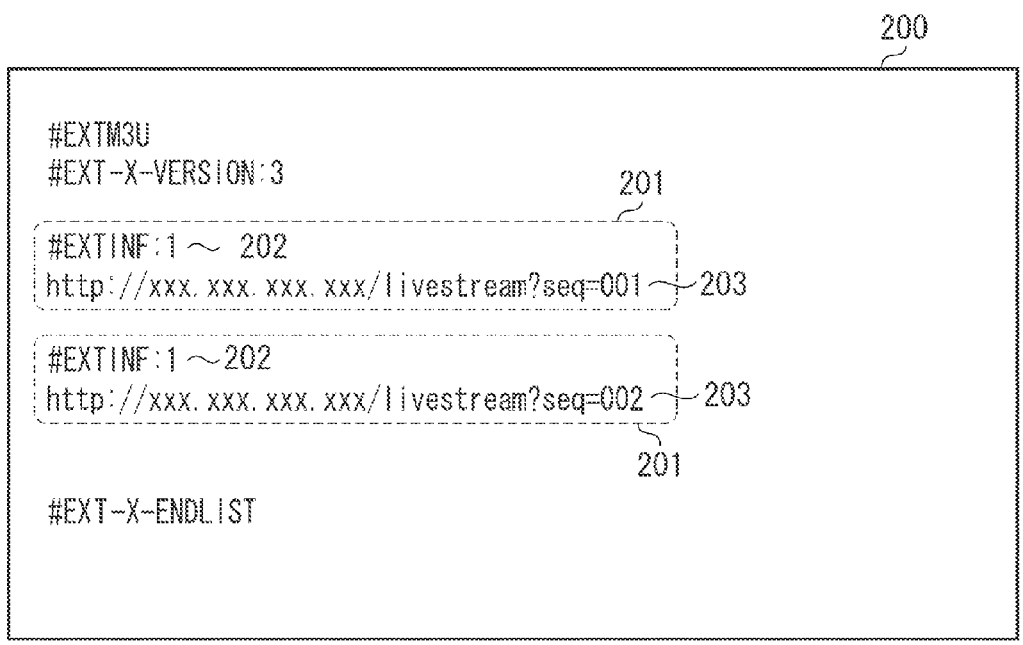
FIG. 2 is a diagram illustrating one example of a playlist.

FIG. 2 illustrates an example of a playlist. A playlist 200 is metadata indicating the segment data, which the receiving apparatus 30 can acquire, out of a plurality of pieces of the segment data obtained by dividing the content data acquired by the playlist management unit (not illustrated). In FIG. 2, one piece of acquired information 201 corresponds to one piece of the segment data, thus each piece of acquired information indicates information for acquiring corresponding piece of the segment data. The playlist 200 can indicate the pieces of the segment data, which the receiving apparatus 30 can acquire, based on the acquired information 201. Further, the playlist 200 can indicate the pieces of the segment data, which the transmission apparatus 20 can transmit, based on the acquired information 201. In FIG. 2, on the playlist 200, each piece of the acquired information 201 is listed in order of reproducing the corresponding pieces of the segment data.

According to the present exemplary embodiment, the playlist 200 can contain a plurality of the acquired information 201. Furthermore, according to the present exemplary embodiment, the acquired information 201 can be not included in the playlist 200. If the playlist 200 does not contain the acquired information 201, it means that there is no segment data, which the receiving apparatus 30 can acquire. Further, if the playlist 200 does not contain the acquired information 201, it means that there is no segment data, which the transmission apparatus 20 can transmit.

Furthermore, according to the present exemplary embodiment, each piece of the acquired information 201 contains reproduction time 202 and location information (URL) 203 respectively. Based on the location information 203 contained in the playlist 200, the receiving apparatus 30 can receive the segment data by transmitting a request for segment data to be received to the transmission apparatus 20.

In step S401, if the determination unit 306 has determined that the latest playlist has been generated and updated (YES in step S401), then in step S402, the determination unit 306 determines whether the latest playlist has been already transmitted for the session. In step S402, if the determination unit 306 has determined that the latest playlist has not been transmitted (NO in step S402), then in step S403, the list transmission control unit 302 controls the transmission apparatus 20 to transmit the latest playlist to the receiving apparatus 30, and ends the processing.

On the other hand, if the latest playlist has not been generated and updated in step S401 (NO in step S401), or if the latest playlist has been already transmitted in step S402 (YES in step S402), the determination unit 306 performs the processing in step S404.

In step S404, the determination unit 306 controls the transmission apparatus 20 to stand by until the latest playlist is generated and updated without transmitting the playlist to the receiving apparatus 30. However, a standby time during which the transmission apparatus 20 stands by is set to be within a predetermined time. In other word, in step S404, the determination unit 306 stands by until the latest playlist is generated and updated or until the predetermined time elapses. After the standby time ends, the operation proceeds to step S405. In step S405, the determination unit 306 determines again whether the latest playlist has been generated and updated.

In step S404, if the latest playlist has been generated and updated within the predetermined time, the determination unit 306 ends standby, then in step S405, the determination unit 306 determines that the latest playlist has been generated and updated (YES in step S405). On the other hand, in step S404, if the latest playlist has not been generated and updated, and the predetermined time has elapsed, the determination unit 306 ends standby, then in step S405, the determination unit 306 determines that the latest playlist has not been generated and updated (NO in step S405).

In step S405, if the latest playlist has been generated and updated within the predetermined time (YES in step S405), then in step S403, the list transmission control unit 302 controls to transmit the latest playlist, and the processing ends. On the other hand, if the latest playlist has not been generated and updated within the predetermined time (NO in step S405), then in step S406, the list transmission control unit 302 controls the transmission apparatus 20 to transmit an existing playlist to the receiving apparatus 30, and the processing ends.

If the latest playlist has not been generated within the predetermined time in step S405, then in step S406, the list transmission control unit 302 controls the transmission apparatus 20 to transmit information indicating that the playlist has not been generated to the receiving apparatus 30. In other words, the transmission apparatus 20 transmits the playlist, which does not contain the acquired information 201 illustrated in FIG. 2 to the receiving apparatus 30. If the latest playlist has not been updated within the predetermined time in step S405, then in step S406, the list transmission control unit 302 controls the transmission apparatus 20 to transmit the playlist, which has already been transmitted, to the receiving apparatus 30.

The predetermined time described above, according to the present exemplary embodiment, is set for the determination unit 306. A predetermined time is set as A if the playlist has not been generated in step S401, and a predetermined time is set as B if the playlist has been generated but has not been updated in step S401. The predetermined time A and the predetermined time B are determined based on data capacity of a recording medium provided on the transmission apparatus 20, processing capability of a central processing unit (CPU) provided on the transmission apparatus 20, and a compression technology (coding method) used in the transmission apparatus 20, and are set for the determination unit 306 of the transmission apparatus 20. The predetermined time A and the predetermined time B may be preset by the transmission apparatus 20, may be included in a playlist request when the receiving apparatus 30 transmits the playlist request, or may be notified to the transmission apparatus 20 by an equivalent method. Further, the predetermined time A and predetermined time B may be changed dynamically depending on the situations of communication bands measured in the measurement unit 303. Further, the predetermined time A and the predetermined time B may be the same value or may be different values. Further, the present embodiment is not limited to this, and a common predetermined time may be set without individually setting the predetermined time A and the predetermined time B.

In this manner, if generation and update of the playlist is completed within the predetermined time, with the transmission apparatus 20 according to the present exemplary embodiment, a delay until the latest playlist is transmitted to the receiving apparatus 30 after the latest playlist has been generated and updated can be reduced compared to the transmission of the playlist with the conventional technology.

In step S404 according to the present exemplary embodiment, the determination unit 306 controls the transmission apparatus 20 to stand by until the latest playlist is generated and updated without transmitting the playlist to the receiving apparatus 30, but the present embodiment is not limited to this. In other words, if the latest playlist has not been generated and updated (NO in step S401) or if the latest playlist has been already transmitted (YES in step S402), a method for controlling the transmission apparatus 20 to stand by without transmitting the playlist may be used. In other words, in the above-described case (NO in step S401 or YES in step S402), processing procedure for standing by until the predetermined time is elapsed, and thereafter, determining again whether the playlist has been generated and updated may be used.

Figure 5:
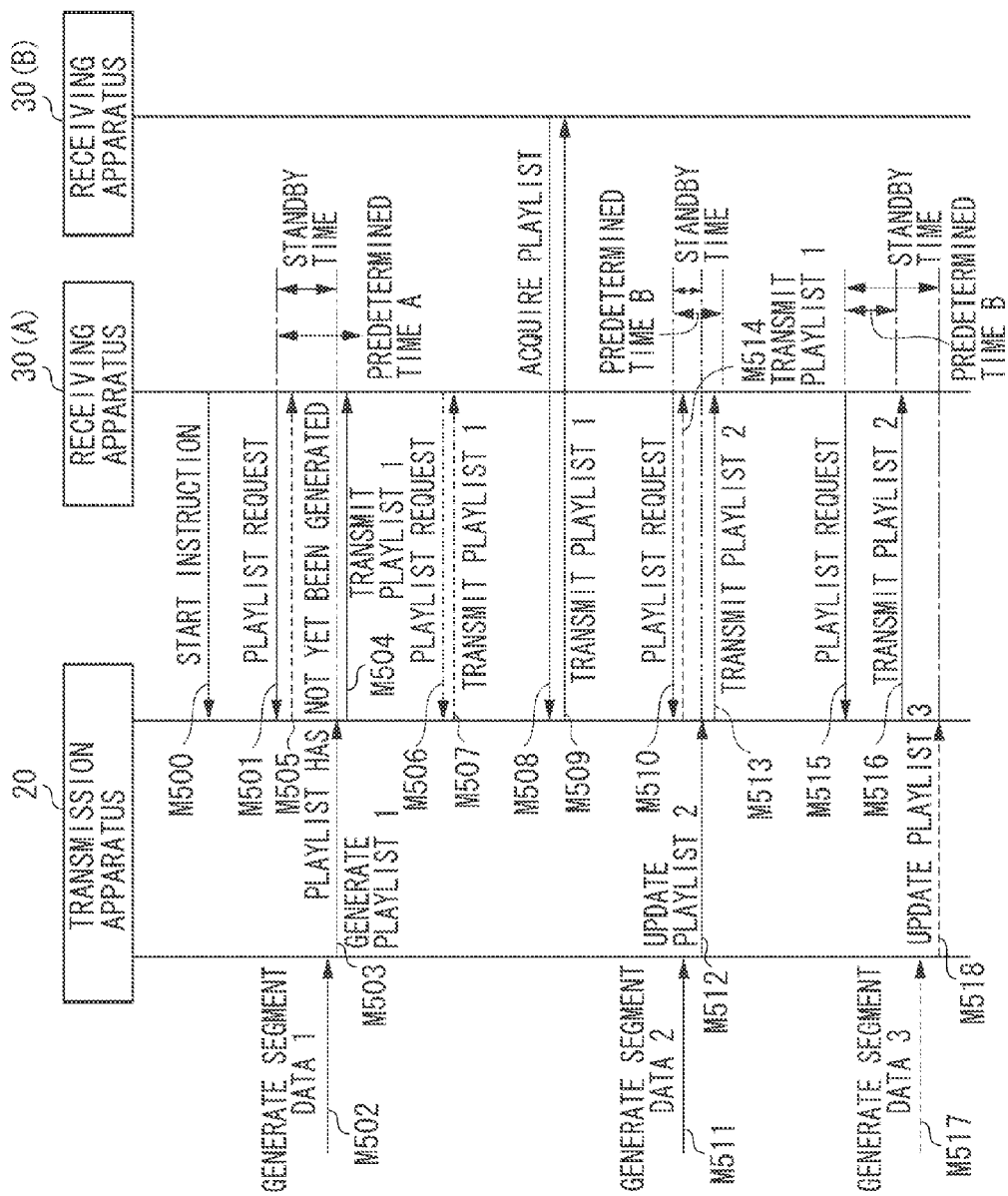
FIG. 5 is a sequence diagram illustrating messages exchanged between the transmission apparatus and the receiving apparatus according to the first exemplary embodiment.

FIG. 5 is a sequence diagram illustrating the flow of messages of the entire system in the transmission apparatus 20 and the receiving apparatus 30, according to the present exemplary embodiment. With reference to the sequence diagram illustrated in FIG. 5, the flow in which the receiving apparatus 30(A) and the receiving apparatus 30(B) transmit the playlist request to the transmission apparatus 20, and the transmission apparatus 20 is responsive to the playlist request will be described below. In FIG. 5, the receiving apparatus 30(A) and the receiving apparatus 30(B) appear in pair as the receiving apparatus, but the receiving apparatus may be one, or may be three or more.

In step M500, the receiving apparatus 30(A) performs start instruction regarding distribution of the content data to the transmission apparatus 20. In step M500, with the start instruction as a trigger, the transmission apparatus 20 starts preparation of distribution of the content data. The start instruction in step M500 may be included in a playlist request in step M501.

Regarding a case in which generation of the playlist is completed within the predetermined time A, the flow in steps M501 to M504 will be described.

In step M501, the receiving apparatus 30(A) transmits a playlist request to the transmission apparatus 20. Then in step M501, the transmission apparatus 20, which has received the playlist request, performs transmission control processing of the playlist illustrated in FIG. 4 described above.

In this process, the generation of the playlist is completed within the predetermined time A. Therefore, in step M502, when the transmission apparatus 20 is notified that the generation of segment data 1 is completed, then in step M503, the transmission apparatus 20 generates a playlist 1. In each playlist 1 to 3 illustrated in FIG. 5 according to the present exemplary embodiment, information equivalent to the contents listed in the playlist 200 illustrated in FIG. 2 is listed.

As illustrated in FIG. 5 in the present exemplary embodiment, after the start instruction in step M500 from the receiving apparatus 30(A), in step M502, the transmission apparatus 20 generates the playlist 1, but the present embodiment is not limited to this. In other words, the playlist may be generated regardless of presence or absence of the start instruction from the receiving apparatus 30(A) in step M500.

Next, in step M504, the transmission apparatus 20 transmits the playlist 1 generated in step M503 to the receiving apparatus 30(A) by responding to the playlist request from the receiving apparatus 30(A) in step M501. As illustrated in FIG. 5, a standby time from the playlist request in step M501 by the receiving apparatus 30(A) to the generation of playlist 1 in step M503 by the transmission apparatus 20 is within the predetermined time A.

In contrast, in the conventional technology, the transmission apparatus 20, which has received the playlist request in step M501, transmits a message that the playlist has not yet been generated to the receiving apparatus 30(A) in step M505 indicated by a dotted line. Then, the receiving apparatus 30(A), which has received the message that a playlist has not yet been generated in step M505, performs timing control of the playlist request, then in step M506, the receiving apparatus 30(A) transmits again the playlist request to the transmission apparatus 20. The transmission apparatus 20, which has received the playlist request in step M506, transmits the playlist 1, which has already generated in step M503, to the receiving apparatus 30(A) in step M507.

In this manner, if the generation of the playlist is completed within the predetermined time A, the transmission apparatus 20 according to the present exemplary embodiment can realize the playlist 1 transmission (in step M504) shorter in a delay time from the playlist request (in step M501) than that in the playlist 1 transmission (in step M507) in the conventional technology. Further, the timing control of the playlist request, which the receiving apparatus 30(A) performs in the conventional technology, can be also omitted, and processing load for the timing control can be reduced.

Next, regarding a case where the latest playlist has not yet been transmitted for the relevant session, the flow in steps M508 and M509 will be described.

In step M508, the receiving apparatus 30(B) transmits a playlist request to the transmission apparatus 20. Then in step M508, in the transmission apparatus 20, which has received the playlist request, the determination unit 306 performs transmission control processing of the playlist illustrated in FIG. 4 described above. In this process, in the processing in step S402 of FIG. 4, since the determination unit 306 determines that the latest playlist has not been transmitted for the relevant session, then in step M509, the transmission apparatus 20 immediately transmits the latest playlist.

Further, regarding a case where update of the playlist is completed within the predetermined time B, the flow of steps M510 to M513 will be described.

In step M510, the receiving apparatus 30(A) transmits a playlist request to the transmission apparatus 20. Then in step M510, the transmission apparatus 20, which has received the playlist request, performs transmission control processing of the playlist illustrated in FIG. 4 described above. In this case, in the processing in step S401 of FIG. 4, the determination unit 306 determines that the latest playlist has not been updated for the relevant session. Consequently, in step S404, the determination unit 306 controls the transmission apparatus 20 to stand by until the latest playlist is updated for a maximum of the predetermined time B.

In this process, since the generation of the segment data 2 in step M511, and the update of the playlist 2 in step M512 are completed within the predetermined time B, then in step M513, the list transmission control unit 302 controls the transmission apparatus 20 to transmit the playlist 2 to the receiving apparatus 30(A).

In the conventional technology, the transmission apparatus 20, which has received the playlist request in step M510, transmits the playlist 1 to the receiving apparatus 30(A) indicated by a dotted line in step M514. Then, the receiving apparatus 30(A), which has received the playlist 1 in step M514, determines that there is no updated information in the playlist, and performs timing control of the playlist request since the receiving apparatus 30(A) has already received the playlist 1 in step M507.

In this manner, if the update of the playlist is completed within the predetermined time B, the transmission apparatus 20 according to the present exemplary embodiment can realize the playlist 2 transmission (in step M504) while the playlist 1 transmission (in step M514) is performed in the conventional technology. The playlist 2 is generated later than the playlist 1.

Further, regarding a case where update of the playlist is not completed within the predetermined time B, the flow in steps M515 and M516 will be described.

In step M515, the receiving apparatus 30(A) transmits a playlist request to the transmission apparatus 20. Then, the transmission apparatus 20, which has received the playlist request in step M515, performs transmission control processing of the playlist illustrated in FIG. 4 described above. In this case, in the processing in step S401 of FIG. 4, since the determination unit 306 determines that the latest playlist has not been updated for the relevant session, then in step S404, the determination unit 306 controls the transmission apparatus 20 to stand by until the predetermined time B is elapsed.

In this case, since update of the playlist is not completed within the predetermined time B, then in step M516, the transmission apparatus 20 transmits the playlist 2. Then, the receiving apparatus 30(A) that has received the playlist 2 in step M516, determines that there is no updated information in the playlist since the receiving apparatus 30(A) has already received the playlist 2 in step M513, and performs timing control of the playlist request.

In steps M517 and M518 indicated by a dotted line, the transmission apparatus 20 generates a segment data 3 in step M517 to perform update of a playlist 3 in step M518.

According to the present exemplary embodiment as described above, even if the playlist has not been generated and updated when the transmission apparatus 20 is received the playlist request, the transmission apparatus 20 determines whether the playlist has been generated and updated within the predetermined times A and B after receiving the playlist request. Accordingly, if there is a playlist that is updated within the predetermined times A and B after the playlist request, the transmission apparatus 20 can reduce a delay until the receiving apparatus 30 acquires the updated playlist after the playlist has been updated, comparing with the method of the conventional technology. In other words, according to the present exemplary embodiment, latest playlists can be transmitted while keeping their continuity.

Next, the transmission control processing of playlists according to a second exemplary embodiment will be described with reference to FIG. 6, and FIG. 7. The configuration of the entire system (illustrated in FIG. 1) according to the present exemplary embodiment, and the functional configuration of the transmission apparatus 20 (illustrated in FIG. 3), are the same as those in the first exemplary embodiment described above. Duplicated descriptions, therefore, will not be repeated and the configurations that are features of the present exemplary embodiment will be described. Further, the same reference numerals are used for corresponding processing units having the same functions as those in the exemplary embodiments.

Figure 6:
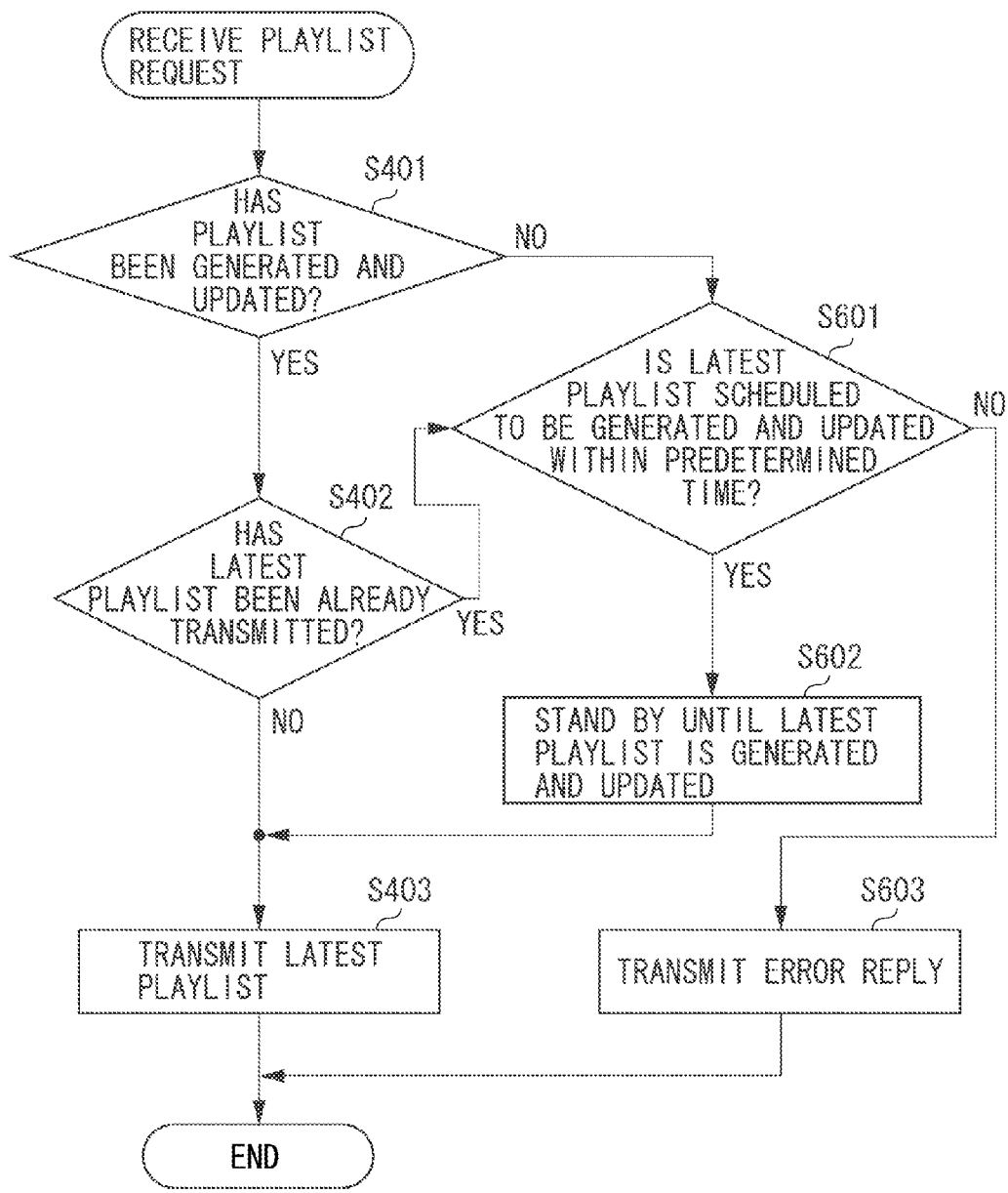
FIG. 6 is a flowchart illustrating an operation of transmission control processing of a playlist in a transmission apparatus according to a second exemplary embodiment.

FIG. 6 illustrates the flow of transmission control processing of a playlist performed by the transmission apparatus 20 according to a playlist request received from the receiving apparatus 30.

If it is determined that the latest playlist has not been transmitted in step S402 of FIG. 6 (NO in step S402), then in step S601, the determination unit 306 determines whether the latest playlist is generated and updated within the predetermined times A and B. In step S601, based on a standby time until the playlist is generated and updated, which is acquired by the time acquisition unit 307, the determination unit 306 determines whether the standby time is longer or shorter than the predetermined times A and B set for the determination unit 306.

In step S601, if the determination unit 306 determines that the latest playlist is generated and updated within predetermined times A and B (YES in step S601), then in step S602, the determination unit 306 controls the transmission apparatus 20 to stand by until the latest playlist is generated and updated. Then, the processing proceeds to step S403.

On the other hand, in step S601, if the determination unit 306 determines that the latest playlist is not generated and updated within the predetermined times A and B (NO in step S601), then in step S603, the list transmission control unit 302 controls the transmission apparatus 20 to transmit an error reply to the receiving apparatus 30. Then, the processing ends.

According to the present exemplary embodiment, the transmission apparatus 20 transmits only an error reply, and the receiving apparatus 30 transmits again a playlist request after standing by in accordance with a certain rule (after a certain period of time), but the present embodiment is not limited to this. In other words, the error reply may be transmitted by being added a time required for the generation and the next update (hereinafter, an scheduled update time) of the playlist in the transmission apparatus 20. Accordingly, the receiving apparatus 30, which has received the error reply added with the scheduled update time, enables the more appropriate timing control by performing timing control for transmitting the playlist request again based on the scheduled update time.

Figure 7:
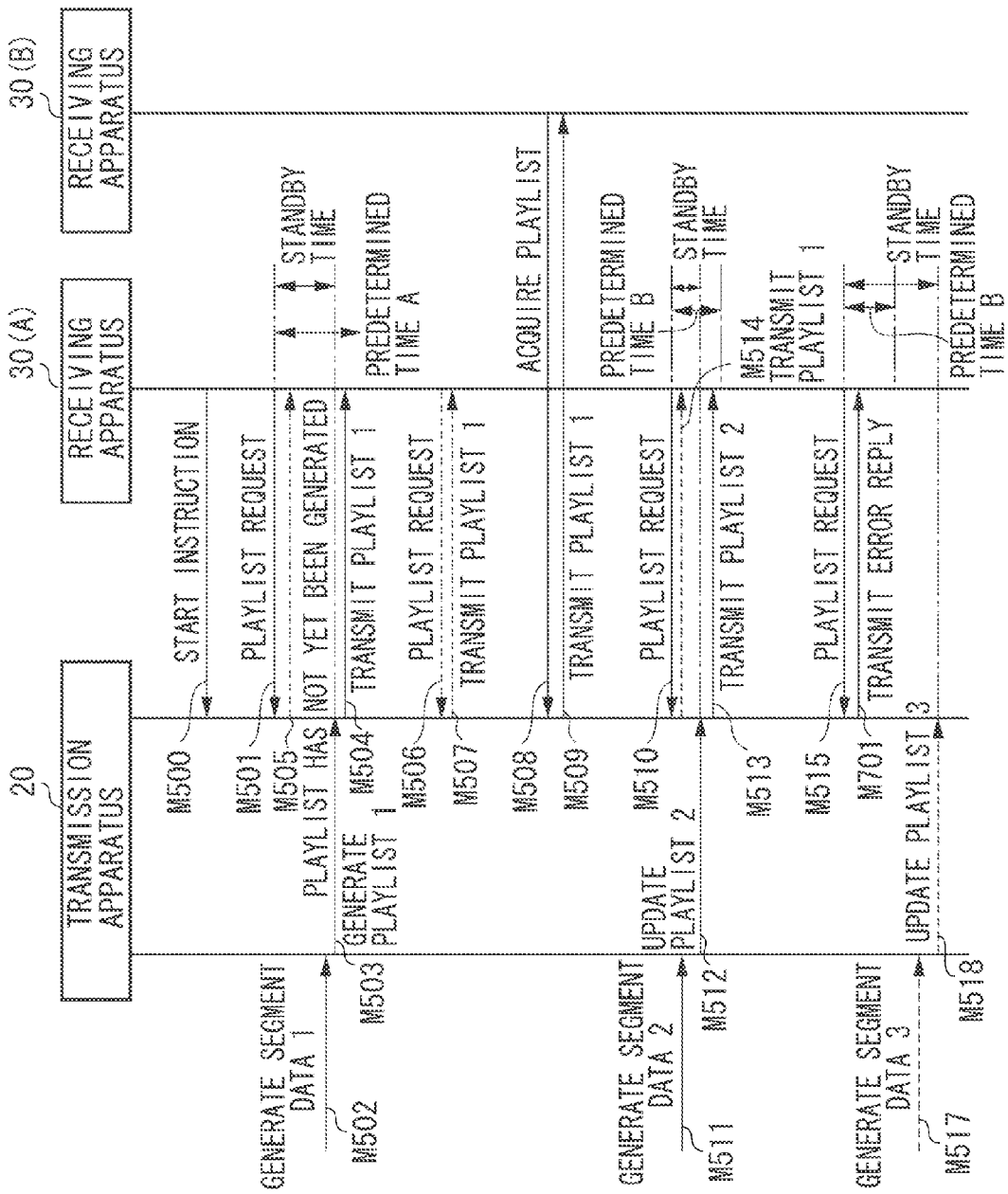
FIG. 7 is a sequence diagram illustrating messages exchanged between the transmission apparatus and the receiving apparatus according to the second exemplary embodiment.

FIG. 7 is a sequence diagram illustrating the flow of messages of the entire system in the transmission apparatus 20 and the receiving apparatus 30 according to the present exemplary embodiment. With reference to the sequence diagram illustrated in FIG. 7, the flow in which the receiving apparatus 30(A) and the receiving apparatus 30(B) transmit a playlist request to the transmission apparatus 20 and the transmission apparatus 20 responds to the playlist request will be described below. In FIG. 7, the receiving apparatus 30(A) and the receiving apparatus 30(B) appear in pair as receiving apparatuses, but the receiving apparatus may be one, or may be three or more.

Regarding a case where the playlist is not completed within the predetermined time B, the flow of steps M515 and M701 will be described with reference to FIG. 7.

In step M515 of FIG. 7, the receiving apparatus 30(A) transmits a playlist request to the transmission apparatus 20. Then, the transmission apparatus 20 that has received the playlist request in step M515 performs transmission control processing of the playlist illustrated in FIG. 6 described above. In this case, in the processing in step S401 of FIG. 6, since the determination unit 306 determines the latest playlist for the relevant session has not been updated, then in step S601, the determination unit 306 determines whether the latest playlist is updated within the predetermined time A.

In this process, since the determination unit 306 determines that the update of the playlist is not completed within the predetermined time A, then in step M701, the transmission apparatus 20 transmits an error reply to the receiving apparatus 30(A). The receiving apparatus 30(A), which has received the error reply in step M701, determines that there is no updated information in the playlist, and performs timing control of the playlist request.

In the present exemplary embodiment as described above, if the determination unit 306 determines that the latest playlist is not generated and updated within the predetermined times A and B, the list transmission control unit 302 controls the transmission apparatus 20 to transmit an error reply to the receiving apparatus 30. Accordingly, the same playlist can be prevented from being transmitted a plurality of times in duplication from the transmission apparatus 20 to the receiving apparatus 30.

Further, according to the present exemplary embodiment, the determination unit 306 determines, in advance, whether the latest playlist is generated and updated within the predetermined time, and if the determination unit 306 determines that the latest playlist is not generated and updated within the predetermined time, an error reply is transmitted. Accordingly, if the latest playlist is not generated and updated within the predetermined time, since the transmission apparatus 20 dose not need to stand by until the predetermined time is actually elapsed, a delay time after transmission apparatus 20 received the playlist request until the error reply is transmitted can be shortened. According to the present exemplary embodiment as described above, even if the playlist is not generated and updated when the transmission apparatus 20 has received the playlist request, the transmission apparatus 20 determines whether the playlist has been generated and updated within the predetermined times A and B after having received the playlist request. Accordingly, if there is a playlist updated within the predetermined times A and B after the playlist request, the transmission apparatus 20 can reduce a delay until the receiving apparatus 30 acquires updated playlist after the playlist has been updated, compared with the method of the conventional technology. In other words, according to the present exemplary embodiment, latest playlists can be transmitted while keeping their continuity.

In the above-described first exemplary embodiment and second exemplary embodiment, descriptions have been provided assuming that corresponding processing units illustrated in FIG. 3 are configured by hardware. However, the processing performed by the corresponding processing units illustrated in these drawings may be executed by a computer program.

Figure 8:
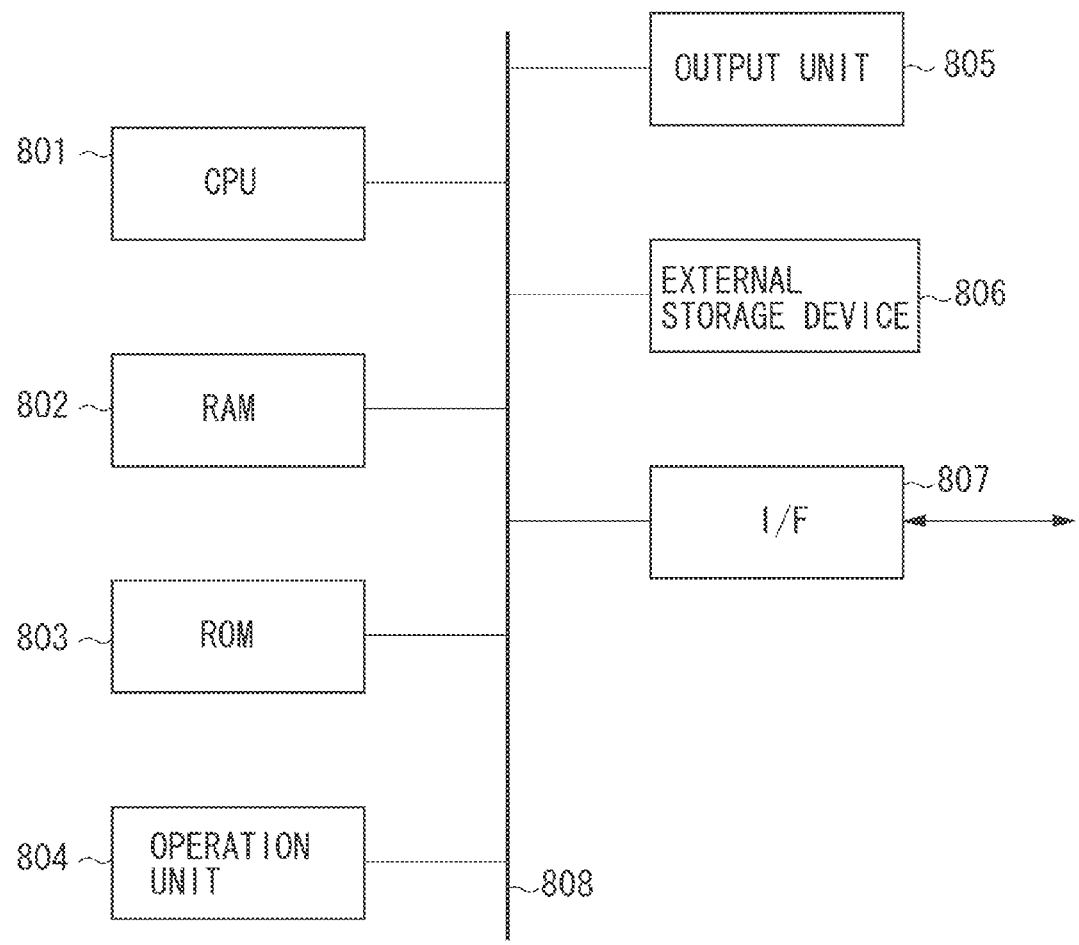
FIG. 8 is a block diagram illustrating hardware configuration example of a computer applicable to the transmission apparatus according to each exemplary embodiment.

FIG. 8 is a block diagram illustrating a hardware configuration example of a computer, which executes the processing performed by corresponding processing units of the transmission apparatus according to the above-described first exemplary embodiment and second exemplary embodiment.

A CPU 801 performs control of the entire computer using a computer program or data stored in a random-access memory (RAM) 802 or a read-only memory (ROM) 803, and executes the processing, which is described above with assuming that the processing is performed by the transmission apparatus according to the above-described first exemplary embodiment and second exemplary embodiment. In other words, the CPU 801 serves as the respective processing units illustrated in FIG. 3.

The RAM 802 has an area for temporarily storing a computer program or data loaded from an external storage device 806 and data acquired from the outside via an interface (I/F) 807. Furthermore, the RAM 802 has work areas used when the CPU 801 executes various types of processing. In other words, the RAM 802 can assign work areas as, for example, frame memories, or can appropriately provide other various areas.

The ROM 803 stores setting data of the computer, and a boot program, and so on.

An operation unit 804 is configured by a keyboard and a mouse and so on, and a user of the computer can input various types of instructions to the CPU 801 by operating the operation unit 804.

An output unit 805 performs control for displaying processing results by the CPU 801. Further, the output unit 805 performs control for displaying processing results by the CPU 801 in a display unit (not illustrated) configured by, for example, a liquid crystal display.

An external storage device 806 is a mass information storage device represented by a hardware disk drive device. In the external storage device 806, an operating system (OS) and a computer program for causing the CPU 801 to realize the functions of the respective units illustrated in FIG. 3 are stored. Furthermore, in the external storage device 806, each image as processing target may be stored.

The computer program and the data stored in the external storage device 806 are appropriately loaded into the RAM 802 based on the control by the CPU 801, and become the processing target by the CPU 801.

A network such as a local area network (LAN) or an internet and other devices such as a projection device and a display device can be connected to an I/F 807, and the computer can acquire or transmit various pieces of information via the I/F 807.

A bus 808 connects each unit described above.

At the operations in the above-described configurations, the CPU 801 mainly performs controlling of operations described by the flowcharts described above.

M3U8 format has been used as a playlist format in each exemplary embodiment described above, but M3U format, Windows Media Player Playlist (WPL) format, and other playlist formats can be also used.

Further, HTTP has been used as data transfer protocols in each exemplary embodiment described above, but other protocols of the same layer or a different layer of open systems interconnection (OSI) reference model, for example, hypertext transfer protocol secure (HTTPS), transmission control protocol (TCP), and user datagram protocol (UDP) can be used.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-287237 filed Dec. 28, 2012, which is hereby incorporated by reference herein in its entirety.

What is claimed is:

1. A transmission apparatus configured to transmit a media segment which is obtained by segmenting media data, the transmission apparatus comprising:
   one or more hardware processors; and
   a memory for storing instructions to be executed by the one or more hardware processors, wherein when the instructions stored in the memory are executed by the one or more hardware processors, the one or more hardware processors perform:
   acquiring a current version of a list including information about one or more media segments that are transmittable to a receiving apparatus;
   receiving an acquisition request of the list from the receiving apparatus;
   determining whether the current version of the list includes media segment information about one or more media segments that have not yet been transmitted to the receiving apparatus;
   deciding, based on determining that the current version of the list includes the media segment information, the current version of the list as the version of the list to be transmitted to the receiving apparatus as a response to the acquisition request;
   deciding, based on determining that the current version of the list does not include the media segment information, a new version of the list generated by updating the current version of the list in response to a completion of a transmission preparation for a new media segment after the receiving of the acquisition request, as the version of the list to be transmitted to the receiving apparatus as the response to the acquisition request, wherein the new version of the list includes information about the new media segment; and
   transmitting the version of the list decided to be transmitted to the receiving apparatus as the response to the acquisition request.

2. The transmission apparatus according to claim 1, wherein the new version of the list is decided as the version of the list to be transmitted to the receiving apparatus, in a case where it is determined that the current version of the list does not include the media segment information and the new version of the list is to be generated within a predetermined time from the receiving of the acquisition request.

3. The transmission apparatus according to claim 1, wherein the media data includes video data or audio data.

4. The transmission apparatus according to claim 1, wherein the one or more hardware processors further performs:
   generating the new version of the list by updating the current version of the list in response to the completion of the transmission preparation for the media segment information after the receiving of the acquisition request such that the new version of the list includes the information about the new media segment.

5. The transmission apparatus according to claim 1, wherein the current version of the list is transmitted to the receiving apparatus at a first point of time in a case where the current version of the list is decided to be transmitted to the receiving apparatus, and
   wherein the new version of the list is transmitted to the receiving apparatus at a second point of time later than the first point of time in a case where the new version of the list is decided to be transmitted to the receiving apparatus.

6. The transmission apparatus according to claim 1, wherein, in a case where the new version of the list is decided as the version of the list to be transmitted to the receiving apparatus as the response to the acquisition request, the new version of the list is transmitted without receiving another acquisition request before the transmission.

7. A transmission apparatus configured to transmit a media segment which is obtained by segmenting media data, the transmission apparatus comprising:
   one or more hardware processors; and a memory for storing instructions to be executed by the one or more hardware processors, wherein when the instructions stored in the memory are executed by the one or more hardware processors, the one or more hardware processors perform:
  acquiring a current version of a list including information about one or more media segments; that are transmittable to a receiving apparatus;
  receiving an acquisition request of the list from the receiving apparatus;
  determining whether a new version of the list including information about a new media segment that has not yet been transmitted to the receiving apparatus is to be acquirable by updating the current version of the list in response to a completion of a transmission preparation for the new media segment within a predetermined time from the receiving of the acquisition request;
  deciding, based on determining that the new version of the list is to be acquirable within the predetermined time, the current version of the list as the version of the list to be transmitted to the receiving apparatus as a response to the acquisition request;
  deciding, based on determining that the new version of the list is not to be acquirable within the predetermined time, the new version of the list as the version of the list to be transmitted to the receiving apparatus as the response to the acquisition request; and
  transmitting the version of the list decided to be transmitted to the receiving apparatus as the response to the acquisition request.

8. The transmission apparatus according to claim 7, wherein the one or more hardware processors further perform:
  acquiring an update time at which the new version of the list gets acquirable,
  wherein whether the new version of the list is to be acquirable within the predetermined time is determined based on the update time.

9. The transmission apparatus according to claim 7, wherein the predetermined time is set based on at least one of data capacity of the transmission apparatus, processing capability of the transmission apparatus, or a coding method for encoding the plurality of media segments.

10. The transmission apparatus according to claim 7,
  wherein the current version of the list is transmitted to the receiving apparatus at a first point of time in a case where the current version of the list is decided to be transmitted to the receiving apparatus, and
  wherein the new version of the list is transmitted to the receiving apparatus at a second point of time later than the first point of time in a case where the new version of the list is decided to be transmitted to the receiving apparatus.

11. The transmission apparatus according to claim 7, wherein the current version of the list is decided as the version of the list to be transmitted to the receiving apparatus as the response to the acquisition request, in a case where it is determined that the current version of the list does not include information about the new media segment and the new version of the list is not to be acquirable within the predetermined time.

12. The transmission apparatus according to claim 7, wherein an error response is transmitted to the receiving apparatus as the response to the acquisition request, in a case where the current version of the list does not include information about the new media segment and the new version of the list is not to be acquirable within the predetermined time.

13. A method for controlling a transmission apparatus configured to transmit a media segment which is obtained by segmenting media data, the method comprising:
  acquiring a current version of a list including information about one or more media segments that are transmittable to a receiving apparatus;
  receiving an acquisition request of the list from the receiving apparatus;
  determining whether the current version of the list includes media segment information about one or more media segments that have not yet been transmitted to the receiving apparatus;
  deciding, based on determining that the current version of the list includes the media segment information, the current version of the list as the version of the list to be transmitted to the receiving apparatus as a response to the acquisition request;
  deciding, based on determining that the current version of the list does not include the media segment information, a new version of the list generated by updating the current version of the list in response to a completion of a transmission preparation for a new media segment after the receiving of the acquisition request, as the version of the list to be transmitted to the receiving apparatus as the response to the acquisition request, wherein the new version of the list includes information about the new media segment; and
  transmitting the version of the list decided to be transmitted to the receiving apparatus as the response to the acquisition request.

14. A non-transitory computer-readable storage medium storing computer executable instructions configured to cause a computer to transmit a media segment which is obtained by segmenting media data, the computer executable instructions comprising instructions for:
  acquiring a current version of a list including information about one or more media segments that are transmittable to a receiving apparatus;
  receiving an acquisition request of the list from the receiving apparatus;
  determining whether the current version of the list includes media segment information about one or more media segments that have not yet been transmitted to the receiving apparatus;
  deciding, based on determining that the current version of the list includes the media segment information, the current version of the list as the version of the list to be transmitted to the receiving apparatus as a response to the acquisition request;
  deciding, based on determining that the current version of the list does not include the media segment information, a new version of the list generated by updating the current version of the list in response to a completion of a transmission preparation for a new media segment after the receiving of the acquisition request, as the version of the list to be transmitted to the receiving apparatus as the response to the acquisition request, wherein the new version of the list includes information about the new media segment; and
  transmitting the version of the list decided to be transmitted to the receiving apparatus as the response to the acquisition request.

* * * * *